(No Model.)
M. SWENSON.
MACHINE FOR PICKING OR OPENING BALES OF COTTON.
No. 573,931. Patented Dec. 29, 1896.
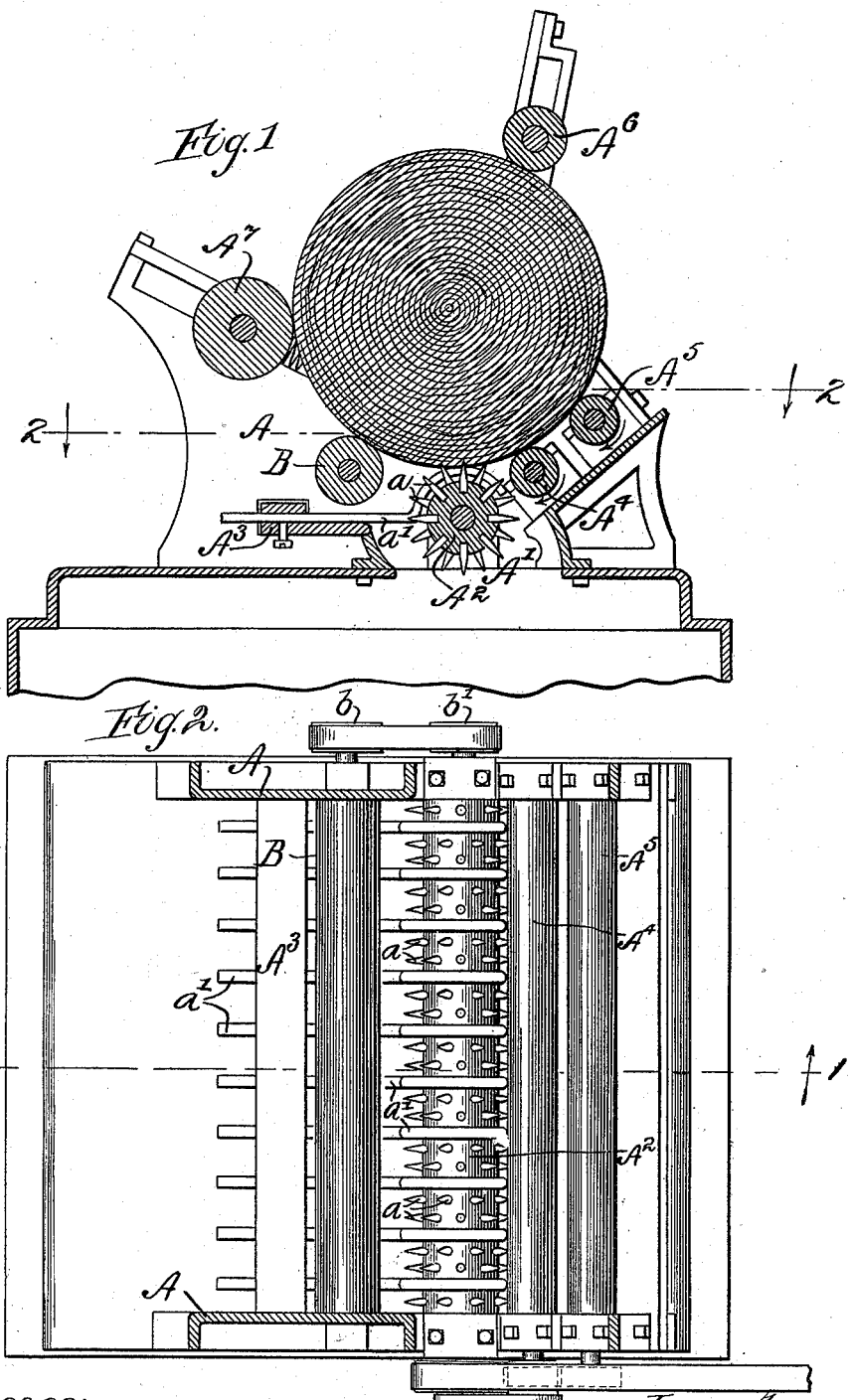
Witnesses:
A. F. Durand.
Inventor:
Magnus Swenson
By Geo. E. Waldo
Att'y.

UNITED STATES PATENT OFFICE.

MAGNUS SWENSON, OF CHICAGO, ILLINOIS, ASSIGNOR TO THE COTTON GINNERS COMPRESS COMPANY, OF JERSEY CITY, NEW JERSEY.

MACHINE FOR PICKING OR OPENING BALES OF COTTON.

SPECIFICATION forming part of Letters Patent No. 573,931, dated December 29, 1896.

Application filed April 28, 1896. Serial No. 589,387. (No model.)

*To all whom it may concern:*

Be it known that I, MAGNUS SWENSON, a citizen of the United States, and a resident of Chicago, in the county of Cook and State of Illinois, have invented a new and useful Machine for Picking or Opening Bales of Cotton, of which the following is a specification.

This invention relates to improvements in machinery for opening or picking bales of cotton to prepare the cotton for spinning, and relates particularly to improvements in machinery for this purpose of the general type heretofore made the subject of an application for Letters Patent of the United States by me, filed in the Patent Office on the 2d day of March, 1896, Serial No. 581,510.

The object of the present invention is to provide improved means for supporting and rotating the bale of cotton during the opening or picking operation; and to this end the invention consists in the various features, combinations of features, and details of construction hereinafter described, and then pointed out in the claims.

In the accompanying drawings a machine embodying my invention is fully illustrated.

Figure 1 is a vertical longitudinal sectional view of my improved machine on the line 1 1 of Fig. 2, and Fig. 2 is a plan section thereof on the line 2 2 of Fig. 1.

The frame of my improved machine consists of rigidly-supported lateral frame-plates or standards A. Mounted so as to rotate freely in suitable bearings formed in said plates A is a picker-cylinder A', which consists of a solid hub or body portion $A^2$, in which are secured a plurality of picker-teeth $a$.

Each secured at one end in a transverse bar $A^3$, supported in fixed position on the frame-plates A, are a plurality of rigid rods or fingers $a'$, the free ends of which are upwardly bent or curved and pass over and closely adjacent to the top of the body portion $A^2$ of the picker-cylinder A', the picker-teeth $a$ being so arranged as to form spaces for the reception of said rods or fingers $a'$.

The picker-teeth $a$ are of such length that, as the picker-cylinder A' rotates, the ends of said teeth will project above the rods or fingers $a'$.

My improved machine also comprises a driven roll $A^4$, which operates as a dead knife-roll, against which the picker-cylinder A' works, and also operates to impart rotation to a bale while being picked or opened; a driven bale supporting and rotating roll $A^5$, mounted above and at one side of the roll $A^4$; bodily-movable rolls $A^6$ $A^7$ and means to hold the same yieldingly in contact with the surface of a bale in position in the machine, whereby the bale will be maintained within the range of operation of the picking and rotating instrumentalities, as will be fully understood by reference to said prior application filed by me on the 2d day of March, 1896, Serial No. 581,510.

A machine embodying my present invention also comprises a roll B, mounted so as to rotate freely in suitable bearings formed in the frame-plates A on the opposite side of the picker-cylinder A' from the rolls $A^4$ $A^5$ and above the fingers $a'$ in such position that the surface of said roll B will be exteriorly tangent to a circle to which the surfaces of the rolls $A^4$ $A^5$ and the curved portions of the fingers $a'$ are also tangent.

Rotary movement in the same direction and preferably at the same surface speed as that at which the rolls $A^4$ $A^5$ are driven is imparted to the roll B by means of a belt adjusted to pulleys $b$ $b'$, secured to the shaft of said roll B and to the shaft of the picker-cylinder A', respectively.

By curving the free ends of the fingers $a'$ upward over the picker-cylinder A', as shown, a space is formed between said fingers and the bale to receive the roll B.

As in the machine described in said prior application, Serial No. 581,510, the picker-cylinder A' is mounted so as to discharge the picked or loosened cotton into a closed chamber formed beneath the machine, whence it may be removed by any suitable means.

I claim—

1. In a cotton-bale picking or opening machine, the combination of a picker-cylinder, a series of rigid rods or fingers each of which comprises an upwardly bent or curved portion, which passes over and closely adjacent to the body portion of said picker-cylinder and bale supporting and rotating instrumentalities, comprising driven rolls mounted, one in the rear of said picker-cylinder above said rigid fingers and another in front of said picker-cylinder in such position that the ends of the picker-teeth will pass close to the surface thereof, substantially as described.

2. In a cotton-bale picking or opening machine, the combination of a picker-cylinder, a series of rigid rods or fingers each of which is rigidly supported at one end and the free ends thereof being upwardly bent or curved and passing over and closely adjacent to the body portion of the picker-cylinder and bale supporting and rotating instrumentalities, comprising driven rolls mounted, one in the rear of said picker-cylinder above said rigid fingers and another in front of said picker-cylinder, closely adjacent to the free ends of said rigid fingers and in such position that the ends of the picker-teeth will pass close to the surface thereof, substantially as described.

In testimony that I claim the foregoing as my invention I have hereunto set my hand this 16th day of April, 1896.

MAGNUS SWENSON.

Witnesses:
F. C. CRITTENDEN,
E. M. CARSON.